Nov. 4, 1952        F. W. KOHOUT        2,616,399
BEARING FOR WATER METER CHAMBERS
Filed Aug. 25, 1949
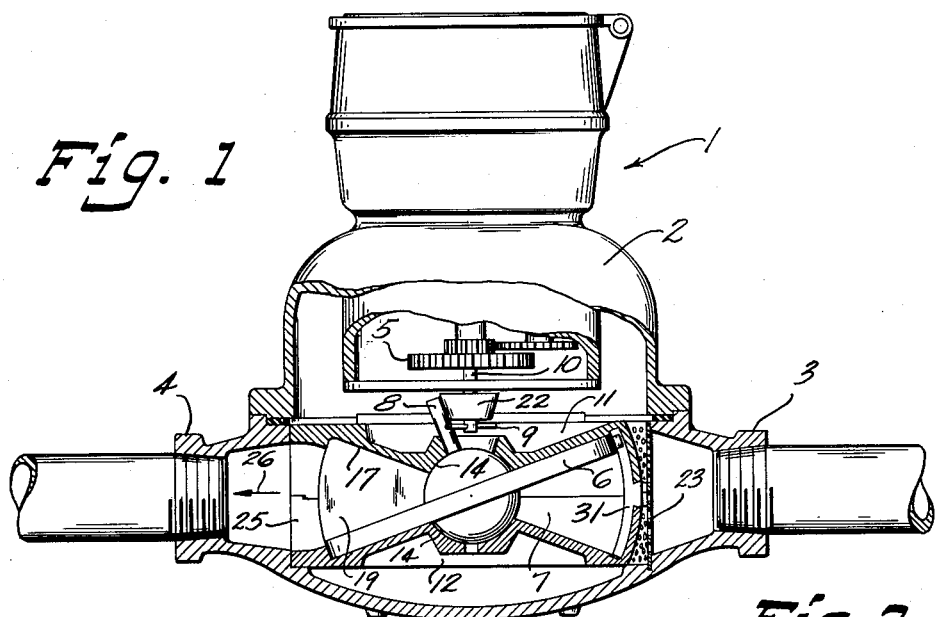
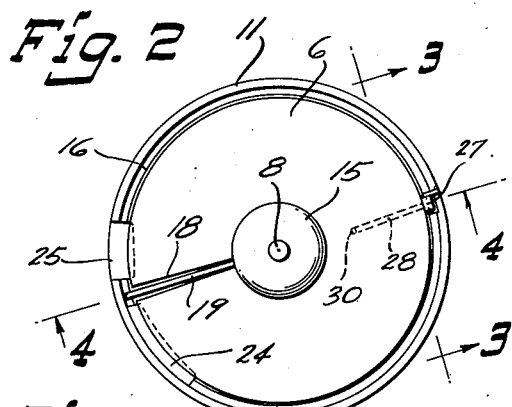
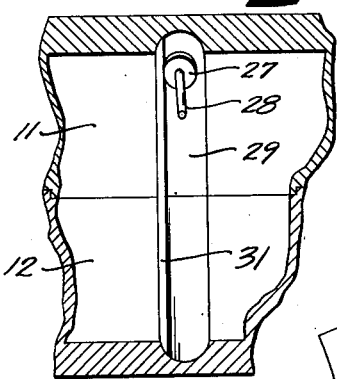
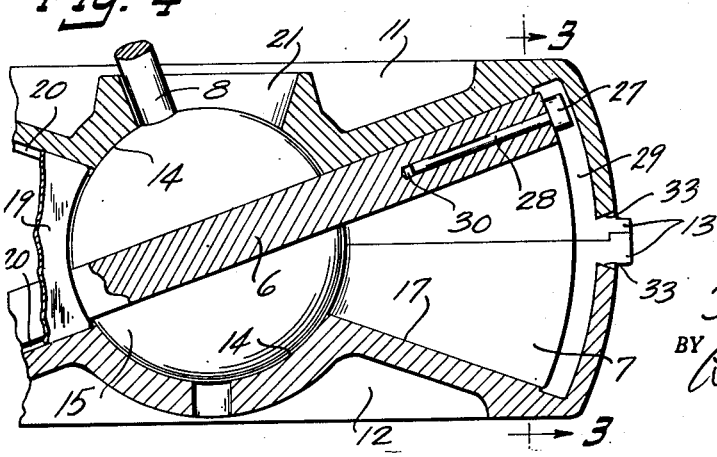
INVENTOR.
Frank W. Kohout
BY Andrus & Sceales
Attorneys Patented Nov. 4, 1952

2,616,399

UNITED STATES PATENT OFFICE 2,616,399

BEARING FOR WATER METER CHAMBERS

Frank W. Kohout, Milwaukee, Wis., assignor to Badger Meter Manufacturing Company, Milwaukee, Wis., a corporation of Wisconsin Application August 25, 1949, Serial No. 112,257

1 Claim. (Cl. 121—69)

This invention relates to water meters and the like and particularly to the nutating disc and chamber therefor.

The invention provides a thrust roller carried by the disc and a bearing plate member therefor carried by the chamber which receives the rotational thrust of the disc.

A principal object of the invention is to secure the bearing plate firmly within the chamber within close tolerances and without distorting or substantially weakening the walls of the chamber.

A more particular object is to secure the plate within the chamber without splitting the wall of the chamber.

A further object is to facilitate the machining of the chamber to close tolerances to receive the bearing plate.

Another object is to eliminate the necessity of a locking pin to maintain the correct positions of the parts comprising the meter chamber.

Another object is to ensure the accurate positioning of the plate member within the chamber when the same is assembled.

These and other objects and advantages will be more fully set forth in the following description of a preferred embodiment of the invention illustrated in the accompanying drawing.

In the drawing:

Figure 1 is a side elevation of a water meter with the lower portion thereof broken away to show the disc housing which is sectioned to show the interior chamber;

Fig. 2 is a plan view of the disc as disposed within the lower half of the chamber showing the bearing roller in engagement with the plate member;

Fig. 3 is an enlarged vertical section through the chamber and disc taken on line 3—3 of Fig. 2;

Fig. 4 is an enlarged sectional view taken on line 4—4 of Fig. 2 with the bearing insert for the roller removed; and Fig. 5 is a side elevation of the bearing insert adapted to be disposed in the slot shown in Fig. 4.

The meter 1 shown in the drawing includes the outer housing 2 having inlet and outlet pipe connections 3 and 4, respectively, and the gear train 5 adapted to drive the register, not shown, in the upper part of housing 2.

The disc 6 operates in the chamber 7 in the lower part of housing 2 in response to the flow of water through the meter, as will be more fully described, and carries the spindle 8 which engages and rotates the driving pawl 9 carried on the lower end of shaft 10 of gear train 5.

Chamber 7 is comprised of the cast upper and lower members 11 and 12, respectively, which join in a horizontal plane passing through the center of chamber 7 and are provided with interlocking annular flanges 13 which locate the members laterally.

The complementary spherical portions 14 of members 11 and 12 in the center of chamber 7 carry the spherical centerpiece 15 of disc 6 to support the latter within chamber 7 while allowing limited rotational movement of the disc in any direction.

The outer dimension of chamber 7 is spherical as at 16 and fits within close tolerances the outer diameter of disc 6.

The upper and lower faces 17 of chamber 7 are frusto-conical and are dimensioned so that upper and lower faces of disc 6 when tilted in any direction makes a line contact on opposite sides with faces 17.

The radial slot 18 in disc 6 is provided to accommodate the partition 19 disposed vertically and radially of the center of chamber 7 and carried within the slots 20 formed oppositely in members 11 and 12.

Spindle 8 is carried by disc 6 and extends through the center opening 21 in member 12 and engages the conical roller 22 carried by shaft 10 above pawl 9. Roller 22 maintains disc 6 in a tilted position at all times, dividing chamber 7 into parts of variable volume according to the tilted position of the disc with respect to partition 19.

In the operation of meter 1, the water entering inlet connection 3 into housing 2 and through the screen 23 passes into chamber 7 and through the opening 24 on one side of partition 19. The pressure of the water expands the sections of chamber 7 to which the water is admitted by moving disc 6 in a nutating movement as controlled by roller 22. With the expansion of one divided section of chamber 7, as described, the disc discharges the water on the opposite side thereof through the opening 25 in the side of chamber 7 and adjacent partition 19 oppositely of opening 24.

Opening 25 of chamber 7 registers with outlet 4 of housing 2 for delivery of the water from the meter through the outlet in the direction of arrow 26.

The movement of disc 6, through spindel 8 engaging pawl 9, rotates shaft 10 in predetermined relation to the volume of water passing through chamber 7 to register the same through mechanism 5.

In practice, the frictional resistance to movement encountered by disc 6 tends to cause the disc to be rotated in the direction of water flow through chamber 7 until one side of slot 18 in disc 6 engages partition 19. To prevent this, the thrust roller 27 fixed on the end of the small shaft or pin 28 is disposed at the periphery of disc 6 opposite slot 18 of the disc and moves therewith vertically in the end-milled slot 29 in the outer wall 16 of members 11 and 12. Pin 28 carrying roller 27 is loosely disposed for rotation within the hole 30 drilled in the outer periphery of the disc. Hole 30 is offset slightly from a radial position to provide a slight axial thrust of roller 27 against disc 6.

According to the invention, the insert plate 31 facing one side of slot 29 extends the length of the slot to provide a bearing surface for roller 27, and is secured between members 11 and 12 by the small projecting center portion 32 dovetailed between members 11 and 12.

Plate 31 is curved on a center radius corresponding with the center of chamber 7 and is shaped at each end to fit the circular ends of slot 29 as formed by the milling cutter, not shown.

Projection 32 is formed integrally with plate 31 and fits the small slots 33 which are milled through the wall of each member 11 and 12 so as to locate plate 31 against the side of slot 29. The bottom of each slot 33 extends angularly and oppositely to fit projection 32.

Plate 31 may be formed by stamping of nickel-copper or other corrosion resistant metal or of various rigid synthetic plastics having good wear resistance. In designing plate 31 for stamping, the inner corners of projection 32 may be cut away as at 34 to allow for subsequent die wear and accommodate any overhanging metal in slots 33.

Plate 31 extends across the parting line between members 11 and 12 and prevents "clicking" which develops ordinarily if roller 27 is allowed to ride directly against the sides of slot 29 notwithstanding all efforts to secure members 11 and 12 in proper relation as by means of a pin or the like.

Projection 32, fitting in slots 33, serves to lock chamber members 11 and 12 in rotative relation preparatory to securing the members.

The dovetailed projection 32 provides adequate securing of plate 31 without other means and, as has been stated above, need not extend any appreciable depth or such as to weaken the walls of members 11 and 12, but may be cut through the walls in a simple milling operation.

The projection need not be a press fit in slots 33 and will not, if loose, even then allow plate 31 to be displaced appreciably so as to interfere with the movement of disc 6.

Plate 31 is readily dimensioned to maintain close clearances with respect to slot 29 and its positioning may be entirely determined by the depth of cut of slots 33.

Various embodiments of the invention may be employed within the scope of the accompanying claim.

I claim:

In a disc-type expansible chamber for water meters and the like, a disc, separable complementary cast metal members joining in a transverse plane and defining a chamber adapted to receive said disc for nutating movement therein through said transverse plane, a thrust roller carried by said disc at the periphery thereof, said members having adjoining recesses for movement of said roller in an arc defining a plane substantially normal to said transverse plane and having coplanar adjoining walls at one side of said recesses parallel to said normal plane, said chamber members having oppositely disposed slots formed in the corresponding meeting edges thereof outwardly of and opening into said recesses adjacent to said adjoining walls, the depth of said slots from the corresponding edges of the members being insufficient to cause appreciable distortion of the chamber members when the slots are cut therein, and a single-piece flat bearing member disposed in said recesses and having a body seated against said walls of said recesses and disposed between said walls and said roller to support the radial thrust of said roller, said bearing member having a coextensive, flat dovetailed projection extending into said slots, and said slots being of complemental depths to form a dovetailed interlock with said projection and positively secure said bearing member against movement in said normal plane and against displacement by said roller.

FRANK W. KOHOUT.

REFERENCES CITED

The following references are of record in the file of this patent:

UNITED STATES PATENTS

| Number | Name | Date |
|---|---|---|
| 1,857,851 | Marden | May 10, 1932 |
| 2,244,539 | Krueger | June 3, 1941 |